J. R. GRANT.
EGG CANDLER.
APPLICATION FILED MAR. 15, 1916. RENEWED JAN. 24, 1919.
1,310,750.  Patented July 22, 1919.
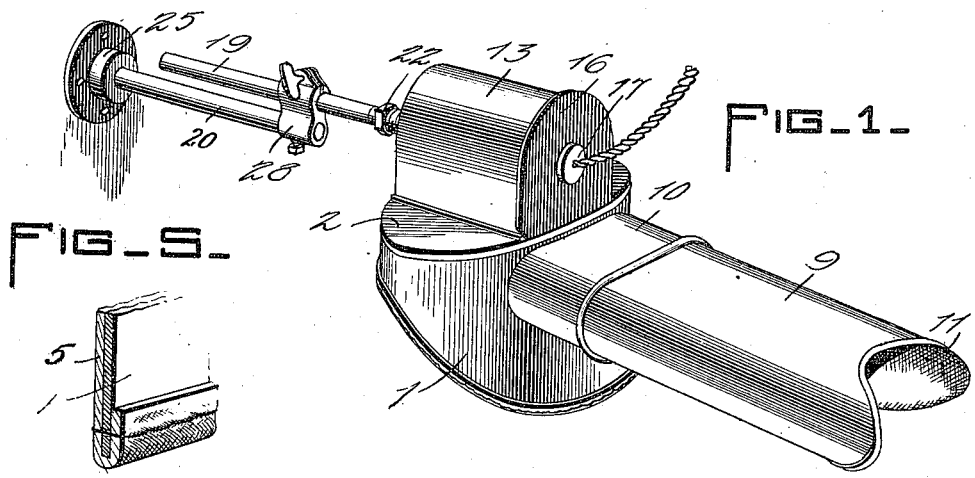
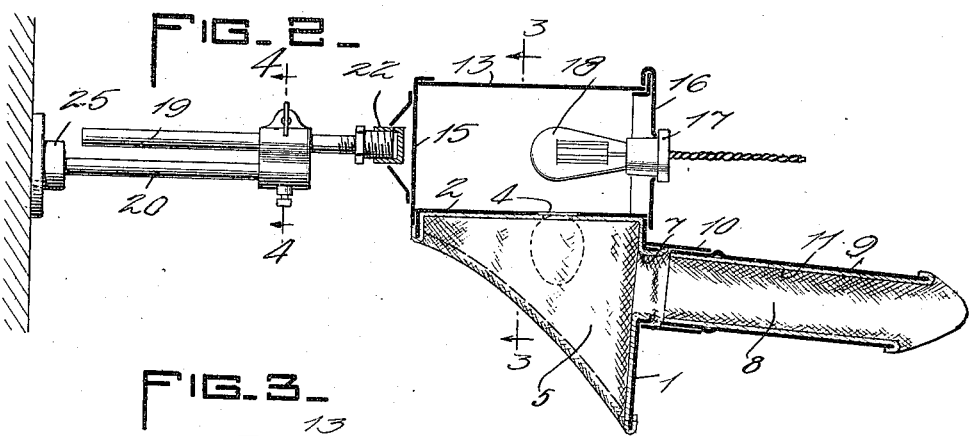
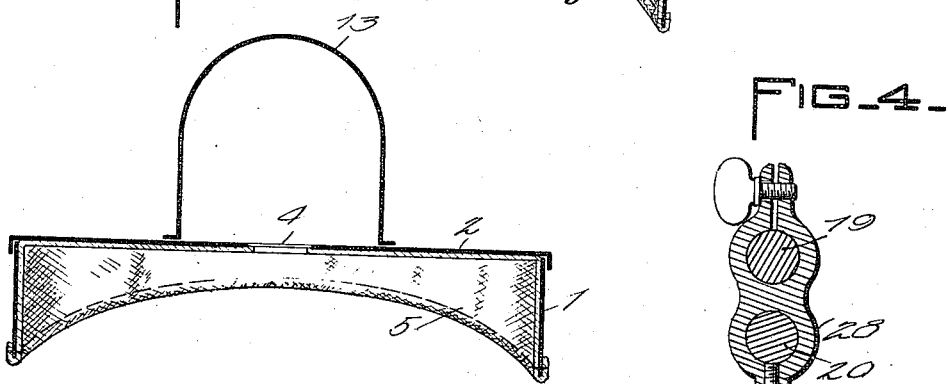
WITNESSES:
INVENTOR
JESSE R. GRANT,
BY
ATTORNEYS

UNITED STATES PATENT OFFICE.

JESSE R. GRANT, OF KOKOMO, INDIANA.

EGG-CANDLER.

1,310,750. Specification of Letters Patent. Patented July 22, 1919.

Application filed March 15, 1916, Serial No. 84,457. Renewed January 24, 1919. Serial No. 272,967.

*To all whom it may concern:*

Be it known that I, JESSE R. GRANT, a citizen of the United States, and a resident of Kokomo, in the county of Howard and State of Indiana, have invented new and useful Improvements in Egg-Candlers, of which the following is a specification.

My invention is an improvement in egg candlers, and the invention has for its object to provide a device of the character specified, by means of which eggs may be graded and simultaneously candled without the use of a dark room, wherein a hood is provided with a light chamber connected therewith, and having an opening between the hood and the light chamber for receiving the small end of the egg, the hood being open on its under side to permit the insertion of the egg in the opening, the hood having an inspection opening for permitting the egg to be seen while it is illuminated.

In the drawings:

Figure 1 is a perspective view of the improved candler.

Fig. 2 is a longitudinal vertical section.

Figs. 3 and 4 are enlarged sections on the lines 3—3 and 4—4 respectively, of Fig. 2, each view looking in the direction of the arrows adjacent to the line, and Fig. 5 is an enlarged detail perspective view of a portion of the candler.

As is known, in the usual process of candling eggs, a dark room is necessary and candlers work in the dark room, thus involving a hardship on the man to do the work, especially in hot weather, and necessitating much inconvenience and expense to the shipper, owing to the necessity of the dark room.

The present invention is designed to relieve the shipper of this inconvenience and expense, and to relieve the candlers of the hardship above referred to, permitting them to candle the eggs in the light with perfect efficiency. With the improved device it is also possible to grade and candle eggs at the same time, because the egg is open to inspection in the light. As is known, a slightly stained or shiny egg cannot be distinguished from perfect eggs in the ordinary candling room. Neither does the dark room permit the men to systematize their work since it is impossible for them to place their eggs close to the room, as they would be in the way when going in and out. In addition they must close the curtains when entering or leaving the room, and must flash their lights in order to determine when the bottom filler is full. With the improved device, however, the work may be systematized, since it is possible to observe the eggs while candling, and the eggs both candled and uncandled may be placed in the working room near the benches.

In the present embodiment of the invention, a light chamber is provided, having a restricted opening for receiving the end of the egg, and of a size to permit the opening to be closed by the egg to shut off all light not transmitted through the egg, the light chamber having a depending screen wall at one side of the opening, the screening wall being provided with an inspection opening. A plate 2 is provided upon which is arranged a light chamber, the said chamber having a body 13 U-shaped in cross section and connected with the plate 2. The chamber is closed by heads 15 and 16 and a socket 17 is connected with the head 16 for receiving an incandescent bulb 18. The plate 2 has an opening 4, in such position that the rays of light from the bulb will pass through the opening. A hood or screening wall 1 depends from the plate 2, the said hood or wall being in fact a depending flange which is provided at one point with an inspection opening and is cut away at the opposite side to almost the level of the plate. At the inspection opening the hood or screening wall has a nipple 7 of elliptical cross section, and the said hood or wall and the nipple are lined with light absorbing material indicated at 5 and 8 respectively. A tubular member 9 is connected with the nipple by means of a sleeve 10, the tubular member being elliptical in cross section and lined with light absorbing material 11 and having its outer end shaped to fit the face of the user.

In practice it is convenient to support the candler in a suitable position for use, and for this purpose a bracket consisting of sections 19 and 20 connected by a double sleeve 28 is provided. The section 19 is connected with the head 15 of the light chamber, as indicated at 22, and the sections 19 and 20 of the bracket are adjustable with respect to each other. The section 20 is connected to a fixed support, as indicated at 25.

As shown in Fig. 5 the light absorbing material is bent upwardly over the edge of the hood and is secured to the lining of the head by stitching.

In use the device is arranged as shown in Figs. 1 and 2, being supported at a convenient height by means of the bracket. It will be noticed that the lower edge of the body 1 is cut away on an incline, and that the deepest portion of the body is at the side adjacent to the nipple 7. In order to candle an egg, the large end of the egg is placed within the opening 4, and it will be noticed that the lining 5 has an opening registering with the opening 4, in order that the light may pass freely through the opening 4 into the head. The egg is placed as shown in Fig. 2, and the operator with his eyes at the outer end of the tubular member 9, may observe the condition of the egg while it is illuminated at the opening 4, and within the dark room constituted by the hood. The body 1 of the hood encircles the egg, shutting off the light of the candling room, so that it does not interfere with the candling of the egg. Since it is not necessary to darken the candling room, the eggs may be graded and candled at the same time. Neither does the use of the candler affect the eyesight or cause headache, and eggs may be candled after night fall with the lights burning in the room. The operator stands in a natural position and there is no obstruction to the proper handling of the eggs. The hood excludes all light from above and in front of the candler. It is not necessary to place the face in contact with the outer end of the tubular member.

I claim:

1. An egg candler comprising a hood and a light chamber, the hood being open at the opposite side from the lighting chamber and having an opening communicating with the lighting chamber for receiving the end of the egg to be candled, said hood having a lateral inspection opening perpendicular to the axis of the egg-receiving opening and at the position occupied by the egg when in the opening, a tubular eye piece connected with the inspection opening, said tube and hood being lined with a light absorbing material, and means for connecting the candler with a fixed support, said means being adjustable for permitting the candler to be moved to and from the support.

2. An egg candler comprising a closed chamber for containing an illuminating means and having a restricted opening for receiving the end of an egg, and of such size that the egg will close the opening and shut off all light not transmitted through the egg, the light chamber having a depending hood or screen at one side of the opening and provided with an inspection aperture at the level of the egg when in the opening.

3. An egg candler comprising a chamber for containing illuminating means and having a restricted opening for receiving the end of an egg, and of a size to be closed by the said egg, said candler having a depending flange at one side of the restricted opening and being provided with an inspection opening, and cut away at the opposite side from the inspection opening.

4. An egg candler comprising a closed chamber for containing an illuminating means, and provided with an opening for receiving the end of an egg, and of a size to be closed by the said egg and exclude the passage of light when transmitted through the egg, and a screening wall at one side only of the restricted opening and having an inspection opening.

5. An egg candler comprising a closed chamber for containing an illuminating means and provided with an opening for receiving the end of an egg, a screening wall at one side only of the opening and having an inspection opening, and means for adjustably connecting the candler to a fixed support.

JESSE R. GRANT.

Witnesses:
C. E. REED,
U. B. REID.

Copies of this patent may be obtained for five cents each, by addressing the "Commissioner of Patents, Washington, D. C."